United States Patent [19]

DeFreitas

[11] Patent Number: 5,367,869

[45] Date of Patent: Nov. 29, 1994

[54] LASER IGNITION METHODS AND APPARATUS FOR COMBUSTORS

[75] Inventor: Dennis M. DeFreitas, Oxford, N.Y.

[73] Assignee: Simmonds Precision Engine Systems, Akron, Ohio

[21] Appl. No.: 81,732

[22] Filed: Jun. 23, 1993

[51] Int. Cl.$^5$ .................. F02C 7/264; F23Q 13/00
[52] U.S. Cl. ........................ 60/39.06; 60/39.821
[58] Field of Search ............ 60/39.06, 39.141, 39.821, 60/39.828; 123/143 B, 143 R; 431/2, 6, 258; 102/201; 204/157.22, 157.61

[56] References Cited

U.S. PATENT DOCUMENTS

| | | | |
|---|---|---|---|
| 3,167,015 | 1/1965 | Smith et al. ............................ | 102/49 |
| 3,258,910 | 7/1966 | Seymour ........................... | 60/39.281 |
| 3,473,879 | 10/1969 | Berberich .................................. | 431/1 |
| 3,528,372 | 9/1970 | Lewis et al. ......................... | 102/201 |
| 3,861,371 | 1/1975 | Gamell ............................ | 123/148 E |
| 4,008,991 | 2/1977 | McAleer .................................. | 431/1 |
| 4,035,131 | 7/1977 | Cerkanowicz ..................... | 60/39.06 |
| 4,082,070 | 4/1978 | Saufferer et al. ................ | 123/119 E |
| 4,124,003 | 11/1978 | Abe et al. ......................... | 123/119 E |
| 4,124,466 | 11/1978 | Morrey ........................... | 204/157.61 |
| 4,173,206 | 11/1979 | Masaki ............................. | 123/119 E |
| 4,255,777 | 3/1981 | Kelly ................................... | 361/228 |
| 4,302,933 | 12/1981 | Smith .............................. | 60/39.821 |
| 4,314,530 | 2/1982 | Giacchetti ........................ | 123/143 R |
| 4,343,687 | 8/1982 | Ronn ............................. | 204/157.61 |
| 4,344,401 | 8/1982 | Masaki ................................. | 123/536 |
| 4,380,786 | 4/1983 | Kelly ................................... | 361/228 |
| 4,380,978 | 4/1983 | Maynard, Jr. et al. .............. | 123/536 |
| 4,416,226 | 11/1983 | Nishida et al. .................... | 123/143 B |
| 4,434,753 | 3/1984 | Mukainakano et al. ......... | 123/143 B |
| 4,439,980 | 4/1984 | Biblarz et al. ....................... | 60/39.06 |
| 4,556,020 | 12/1985 | Hickling ........................... | 123/143 B |
| 4,587,805 | 5/1986 | Winch et al. .......................... | 60/234 |
| 4,605,485 | 8/1986 | Cerkanowicz ..................... | 204/302 |
| 4,618,432 | 10/1986 | Mintz et al. ........................... | 210/748 |
| 4,627,903 | 12/1986 | Chapman et al. .................... | 204/275 |
| 4,630,169 | 12/1986 | Kelly .................................... | 361/225 |
| 4,666,678 | 5/1987 | Lemelson ............................ | 422/186 |
| 4,702,808 | 10/1987 | Lemelson ........................ | 204/157.61 |
| 4,726,336 | 2/1988 | Hoppie et al. ....................... | 123/292 |
| 4,825,658 | 5/1989 | Beebe ................................... | 60/748 |
| 4,852,529 | 8/1989 | Vowles ............................ | 123/143 B |
| 4,947,640 | 8/1990 | Few et al. ........................... | 60/39.06 |
| 4,991,774 | 2/1991 | Kelly ...................................... | 239/3 |
| 5,093,602 | 3/1992 | Kelly ............................... | 313/231.01 |

OTHER PUBLICATIONS

Chang et al., "Laser-indused breakdown in large transparent water droplets," Optical Society of America, Sep. 1988.

"Laser Induced Ignition of Monodisperse Kerosene Fuel Sprays," Thesis Presented to the Faculty of the Graduate School of Cornell University by Ellen Roosman Mell, May 1991.

Technology Today—Textron Lycoming—vol. II No. 3, Oct. 1987, "Radiative Sources To Ignite Gas Turbines" J. Sweet et al.

Technology Today, Textron Lycoming, vol. V No. 1, Fall Sep. 1990, "Does Your 2.5 Liter Engine Put Ouut 2500 Hp?".

H. C. Simmons et al., "Electrostatic Spraying Of Oil-Based Agricultural Products," Pesticide Formulations Fifth Volume (No Date).

Journal Of The Institue Of Energy, Jun. 1984, "The electrostatic atomization of hydrocarbons".

Chang et al., "Micrometer-Size Droplets As Optical Cavities: Lasing And Other Nonlinear Effects," American Institute of Physics Jun. 1987, pp. 509–515.

Forch et al., "Ultraviolet Laser Ignition of Premixed Gases by Efficient and Resonant Multiphoton Photochemical Formation of Microplasmas," Combust Sci and Tech Jun. 1987, vol. 52, pp. 151–159.

Primary Examiner—Timothy S. Thorpe
Attorney, Agent, or Firm—William E. Zielli; Leonard L. Lewis

[57] ABSTRACT

Apparatus for igniting fuel in a combustor having at least one fuel nozzle that emits an atomized fuel spray into a primary zone of the combustion chamber comprising a laser energy source for producing infrared laser energy and optic fiber means for transmitting the laser energy from the laser source into the primary zone of the combustor to ignite the fuel spray. In one embodiment the laser igniter is disposed in a main fuel nozzle of the combustor.

28 Claims, 5 Drawing Sheets

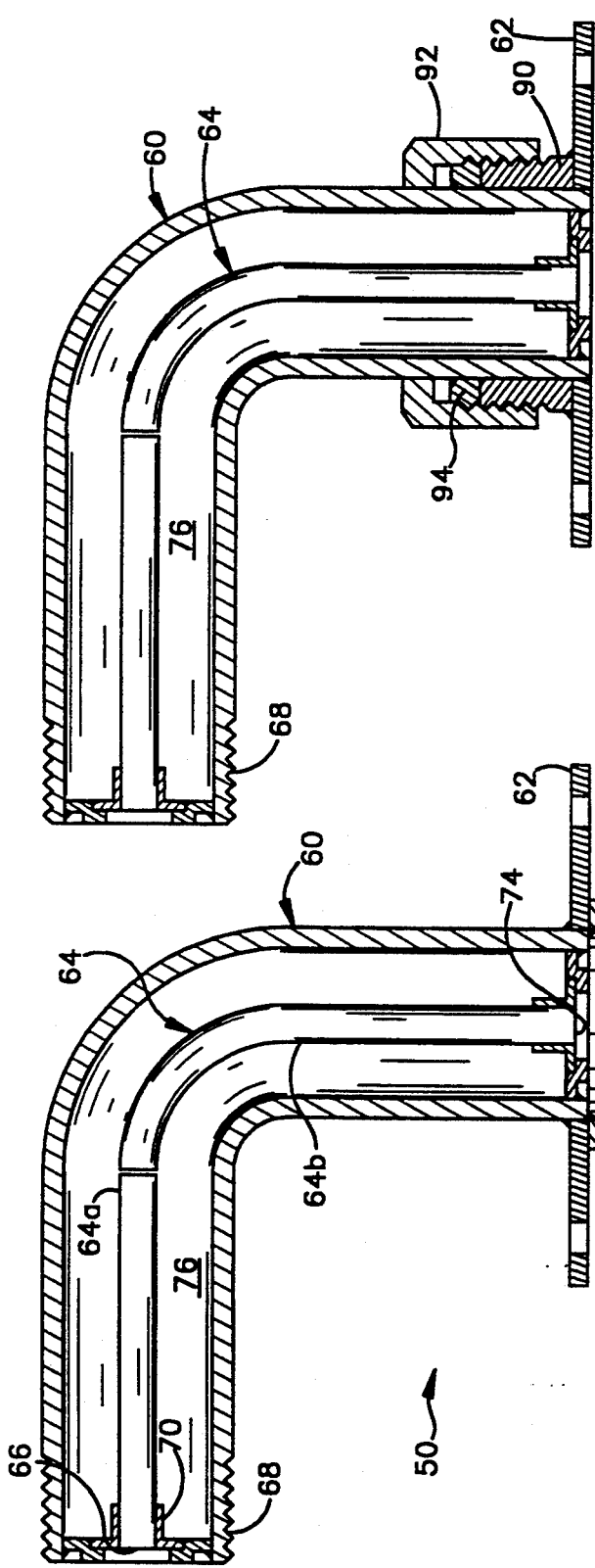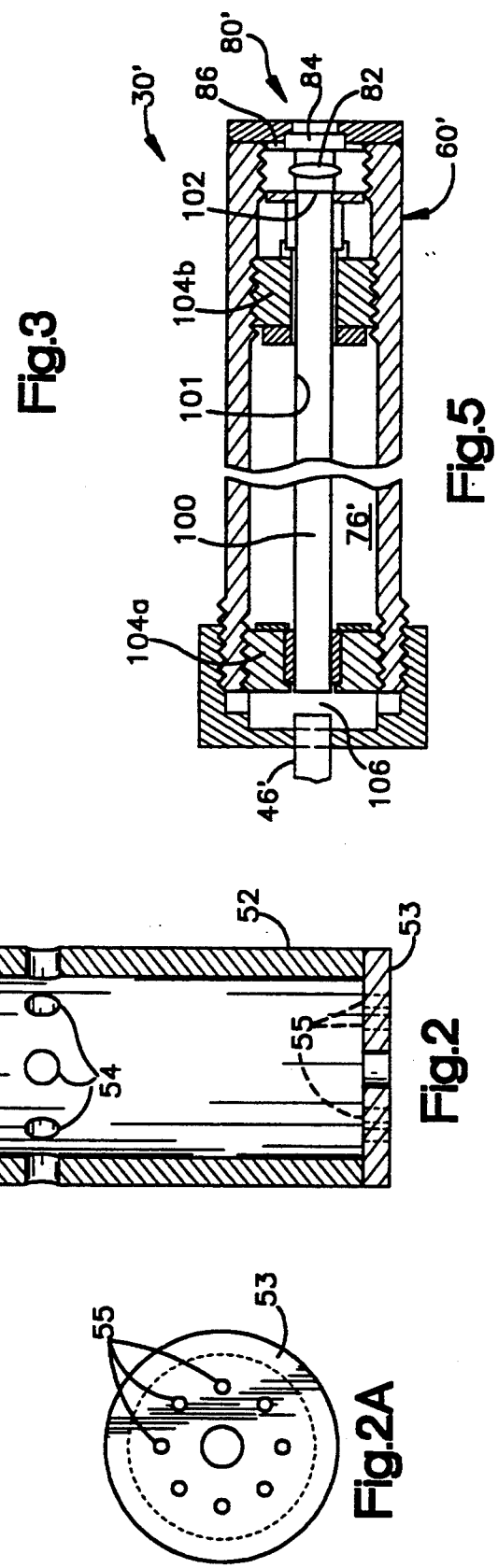

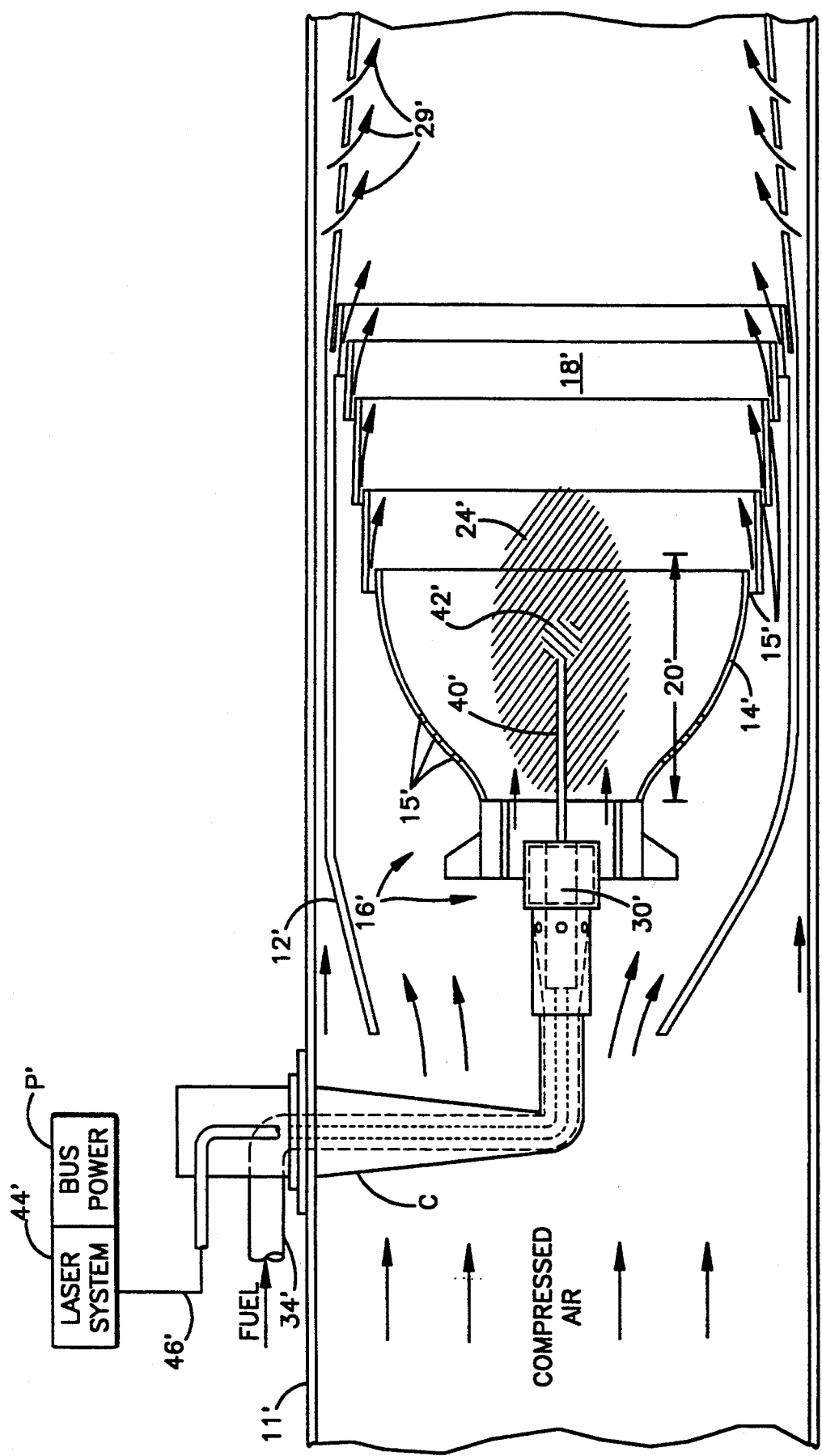

LASER IGNITION METHODS AND APPARATUS FOR COMBUSTORS

BACKGROUND OF THE INVENTION

The invention relates generally to apparatus and methods for igniting air/fuel mixtures in combustors. More particularly, the invention relates to the use of infrared radiation in such apparatus and methods.

The combustor is a fundamental assembly used in turbine and other engines. The combustor typically includes a can or other annular casing that forms part or all of a combustion chamber for the fuel. Within the combustor are one or more fuel nozzles which deliver fuel to the combustion chamber, along with air vents for delivering high pressure air to the combustion chamber. The air/fuel mixture is ignited in or near the region of the combustor closest to the fuel nozzles (i.e. the primary zone). The combustion process continues as the combusting fuel/air mixture moves down to the intermediate zone where additional air is supplied to cool the combustor wall and aid the combustion process. The process continues as the mixture of hot combustion gases enters the dilution zone where dilution air is supplied to cool the exhaust gases to protect the annulus casing from melting and downstream to protect the turbine blades. As is well known, homogeneity of the fuel burn within the combustion chamber is an important design criteria for a turbine engine.

Fuel delivery systems play an important part in the ability to initiate or restart a turbine engine. In known combustors, the fuel nozzles typically include a primary orifice and one or more secondary orifices. The purpose of the nozzle primary orifice is to provide initially a finely atomized fuel spray that can be ignited for engine start. After combustion starts and the engine speed increases, the secondary orifices are opened to increase fuel flow.

The ease with which fuel can be ignited in the combustor depends on several key factors including fuel temperature, the type of igniter used, amount of ignition energy delivered, point of ignition energy delivery and the degree to which the fuel is atomized by the nozzle via the primary orifice. The atomization process is also important with respect to the overall efficiency of the fuel combustion.

Combustors require an igniter device to initiate the combustion process. Known igniters are plasma type spark plugs and glow plugs. Typically, the spark plug is mounted in the combustor wall near the fuel nozzle. In a conventional combustor, the primary zone or optimum region for ignition is the high turbulence region just forward of the nozzle outlet. However, the igniter cannot protrude down into this optimum region because it would be destroyed by the fuel combustion process. Retractable igniters are sometimes used with furnaces, but are not deemed reliable for aerospace applications. Thus, particularly in aircraft engine combustors, the igniter is mounted in a recess on the wall of the combustor near the primary zone. A high energy plasma, high temperature spark kernel is created at the periphery of the combustor wall and protrudes into the combustion chamber. However, there are numerous disadvantages including the fact that the combustor wall tends to act as a heat sink and quenches the intensity of the spark. The fuel/air mixture also is not optimum in this region. Obviously, the combustors are designed so that this type of ignition arrangement works, but it is less than ideal.

A known alternative to the spark kernel is the use of a torch burner which creates a flame that is used to ignite the main fuel supply in the primary zone of the combustion chamber. Known torch burners, however, still produce less than ideal results because of their reliance on conventional fuel supply nozzles and orifices.

Conventional plasma type spark plugs are commonly used for igniters. Unfortunately, by their very nature of using high voltage/current plasma discharge, they exhibit considerable electrode degradation and must be routinely replaced. Also, less than optimum combustion, particularly during engine start up and shut down, and/or fuel exposure, can produce plug fouling which degrades the spark discharge intensity or can prevent ignition. Varnish and other combustion by-products, particularly due to incomplete combustion and fuel evaporation, also can deteriorate plug performance. As a result, very high energy levels must be delivered to the spark plug to insure that carbon and fuel deposits are literally blown off the electrodes to produce an adequate spark. This excess energy, however, causes more rapid degradation of the electrodes, thereby shortening their useful life and increasing maintenance. Furthermore, the high energy required to produce the spark is typically supplied from an exciter circuit, such as a capacitive or inductive discharge exciter. The exciter circuit is located remote from the combustion chamber, however, due to the associated electronics. Consequently, the exciter must be connected to the plug by way of long coaxial cable leads or wires. This wiring causes many problems, not the least of which is simply energy loss. For example, to produce a two joule discharge at the plug, the exciter circuit may be required to output ten joules of energy into the ignition coaxial cable leads, resulting in low ignition system efficiencies, hence higher weight and cost.

The conventional plasma spark plug type igniters have another drawback in that the use of an exciter to produce high discharge voltages typically also requires the use of high tension leads or conductors. At high operating altitudes these leads can exhibit a voltage break down—i.e. corona. Therefore, such ignition systems require careful design including pressure sealing to prevent corona effects at higher altitudes. These design requirements add to the cost of such systems as well as may contribute to less than ideal performance.

An alternative ignition technique has been disclosed in U.S. Pat. No. 4,947,640 issued to Few et al. This patent describes a combustion ignition technique that uses ultraviolet laser energy. The laser energy is directed into the combustion chamber and is absorbed by the atomized fuel droplets. The ultraviolet wavelength region is used because the hydrocarbon fuels commonly used in engines and combustors absorb this wavelength of electromagnetic energy to a high degree. This absorption of the laser energy can sufficiently heat the fuel molecules to produce vaporization and combustion. The wavelength of the laser energy, however, needs to be fine tuned to the optimum wavelength for efficient absorption to produce combustion. Enough energy must be absorbed to create free radicals and oxygen dissociation.

The need to fine tune the operating wavelength of the ultraviolet laser energy is a significant drawback to the aforementioned system. For example, in aerospace technology, and in particular aircraft fuels, the fuel includes various additives and inhibitors (such as, for example, to improve low temperature operating performance to increase fuel conductivity or to reduce soot.) These additives can change the absorption characteristics of the fuel, thus requiring specific wavelength compensation depending on the chemical composition of the fuel at the exact time ignition is required or the redesign of the laser system each time a fuel formulation is modified. This is not, from a practical standpoint, very useful for ensuring ignition and more importantly relight after a flame out condition occurs. Other laser chemistry induced reactions have been investigated. For example, see U.S. Pat. No. 4,343,687.

Another substantial problem is that the combustion by-products that are produced, such as varnish and soot, also are highly absorptive of ultraviolet radiation. This residue most frequently occurs during engine startup and shutdown because during these periods the combustion temperature is lower thus resulting in incomplete combustion of the fuel and additives. Also, exhaust flow is reduced during these periods. As a result, a significant amount of varnish and soot can build up inside the combustor, and in particular will adhere to any surface such as the combustor liner or an optical window in the liner for the ultraviolet laser energy to pass through, and this residue will absorb the very ultraviolet light that is trying to be used to ignite the fuel. Thus, ignition might be inhibited altogether, or the laser power would have to be unacceptably high to ensure ignition.

Another shortcoming of the known laser ignition systems is that they do not take into account the fact that the system should be capable of a direct replacement retrofit into existing systems. Not only would this allow replacement in the field, but this would also not necessitate, in and of itself, a redesign of the combustor. For example, laser augmentation for afterburners has been suggested in U.S. Pat. No. 4,302,933 (issued to Smith), but such a system is impractical from a retrofit approach.

Laser energy has also been suggested for chemical reaction processes in a closed chamber, and for rocket motor combustion. See, for example, U.S. Pat. Nos. 4,666,678 and 4,702,808 issued to Lemelson. These systems, however, require highly controlled and regulated air/fuel supplies such as through valve arrangements or similar means. Such apparatus, therefore, are impractical for flow through type combustors. These systems also specify high energy laser sources (current laser systems utilized for welding and chemical destruction are considered to be high energy laser sources on the order of 1.5 kw to 10 kw), again rendering such apparatus impractical for aircraft combustor applications.

The need exists, therefore, for better and more reliable and more efficient apparatus and methods for initiating combustion, particularly for engine restart. There also is a need for an improved igniter that does not have the problems associated with conventional plasma type plugs. As a practical matter, such an igniter and ignition system should be capable of a direct retrofit replacement for existing plasma plug systems so as to minimize or eliminate the need for combustor designers to redesign the combustors that will use such a new system.

SUMMARY OF THE INVENTION

The present invention contemplates a significant departure from conventional combustion ignition systems by providing in a preferred embodiment, apparatus for igniting fuel in a combustor having at least one fuel nozzle that emits an atomized fuel spray into a primary zone of the combustion chamber, the apparatus having source means for producing infrared laser energy; and optic means for transmitting the laser energy from the source means into the primary zone of the combustor to ignite the fuel spray.

The invention further contemplates the methods for using such apparatus, and further a preferred method for igniting fuel in a combustor comprising the steps of a) producing an atomized fuel spray in a primary zone of the combustor; b) transmitting infrared laser energy into the primary zone; and c) using the laser energy to initiate combustion of the fuel spray.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 2 is a more detailed illustration in longitudinal section of a laser optical igniter (with an end view shown in FIG. 2A) according to the present invention as used in FIG. 1;

FIG. 3 is a simplified schematic of another embodiment of the invention showing a different mounting arrangement for the optical igniter;

FIG. 4 illustrates another embodiment of the invention in which an optical igniter is integrated into a main fuel nozzle;

FIG. 5 is a more detailed illustration in longitudinal section of an optical igniter suitable for use in the embodiment of FIG. 4.

DETAILED DESCRIPTION OF THE INVENTION AND PREFERRED EMBODIMENTS

Figure 6A:
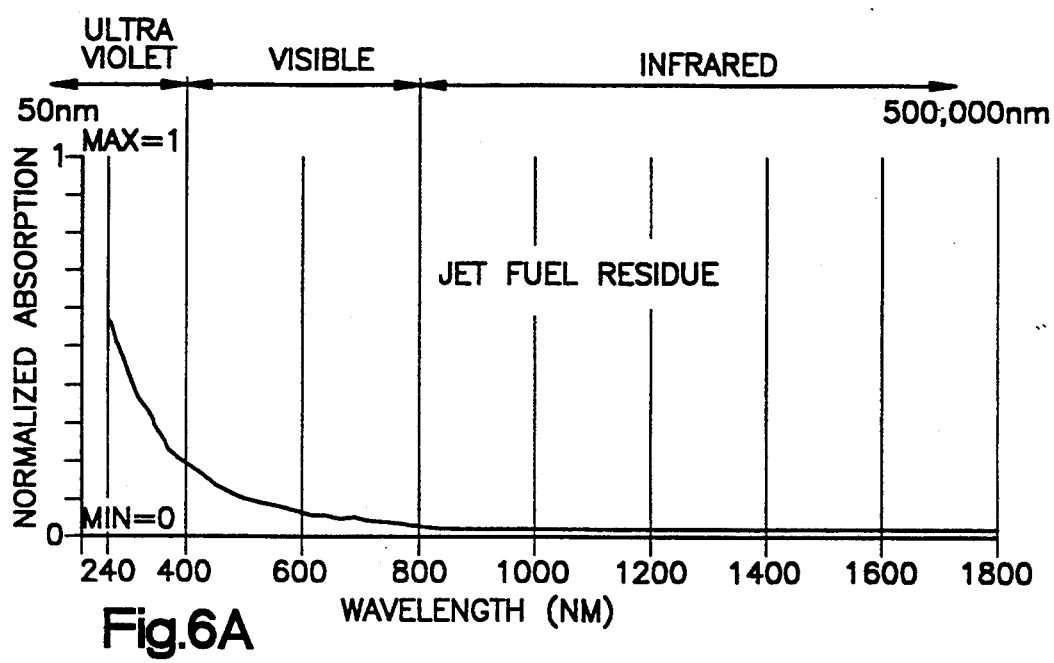
FIG. 6 is a series of graphs A,B,C showing relative absorption versus wavelength for combustion by-products and varnish typically produced in a turbine engine combustor.
Figure 6B:
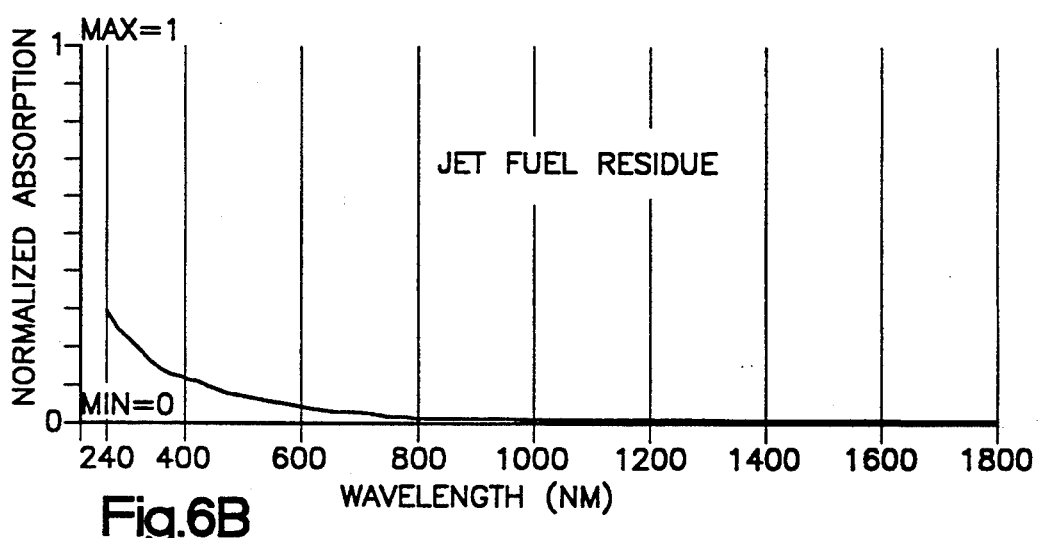
Figure 6C:
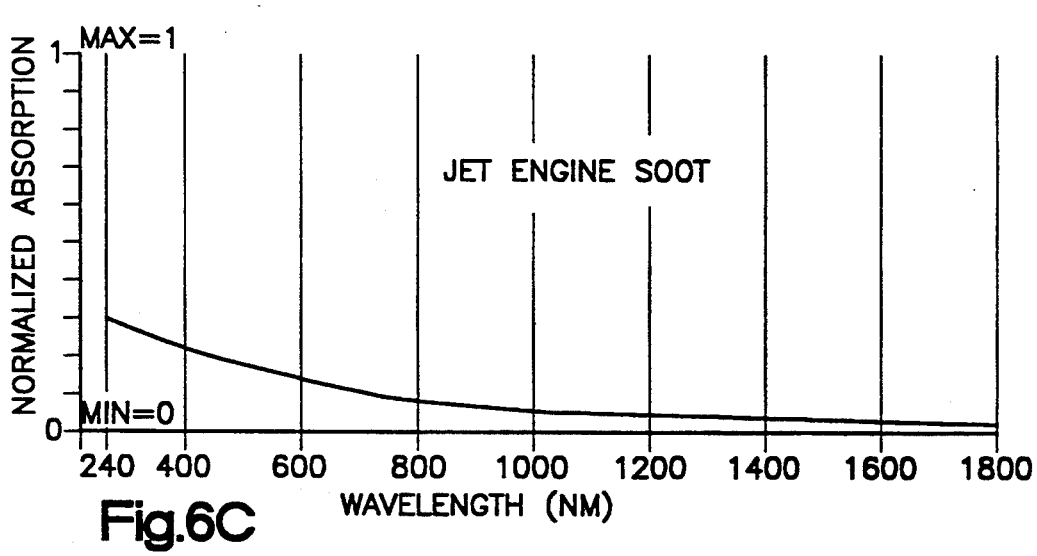

As explained hereinabove, the previously known laser ignition systems for combustors were directed to the use of laser energy in the ultraviolet spectrum. The ultraviolet energy was used to enhance the absorption of the energy by the fuel to permit sufficient heating for combustion. However, I have discovered that the ultraviolet energy is not practical particularly for use in combustors, and specifically combustors used for aircraft turbine engines. This is primarily because the by-products of combustion such as soot, and varnish deposits tend to be highly absorptive of ultraviolet energy. This is illustrated in FIG. 6 in which combustion by-products (i.e. soot and varnish) were produced in a laboratory and then subjected to analysis for absorption characteristics. As shown in a representative manner, this residue is highly absorptive of ultraviolet radiation. Therefore, when such deposits adhere to the combustor liner and any window used for transmitting the ultraviolet radiation into the combustion chamber, a significant and possibly unacceptable amount of the radiation will be absorbed and not available for ignition. The top and middle graphs (fuel residue) and the bottom graph (engine soot) of FIG. 6 show that absorption increases as the incident energy wave length decreases. While the graphs end at 240 nm, absorption is expected to increase to a maxima as wave length continues to decrease. This situation is unacceptable in combustor applications for aircraft engines because the igniters must operate with high reliability and preferably low maintenance. These combustion by-products typically result from incomplete combustion and fuel evaporation during an engine's start-up and shutdown cycles.

As further shown in FIG. 6, the same residue exhibits very little absorption in the infrared spectrum. Although conventional thinking on laser ignition for combustors assumes that energy absorption is the critical factor for initiating combustion, it has been shown that there are other mechanisms at work, and that in fact combustion can occur even with little absorption of the laser energy. These mechanisms include a phenomenon by which atomized fuel droplets actually serve as a lens to create highly focussed and concentrated laser energy. The physics surrounding this phenomena is clearly described in a 1986 technical paper authored by Richard K. Chang titled "MICROMETER-SIZE DROPLETS AS OPTICAL CAVITIES: LASING AND OTHER NON-LINEAR EFFECTS", and a further paper authored by Chang et al. in 1988 titled "LASER-INDUCED BREAKDOWN IN LARGE TRANSPARENT WATER DROPLETS"; both papers published in the American Institute of Physics Conference Proceedings No. 160 and in Applied Optics, vol. 27, no. 12. The entire disclosures of both these papers are fully incorporated herein by reference. The laser energy concentration can be high enough so as to create a plasma type discharge—literally a laser induced spark via Stimulated Raman Scattering (SRS) and Laser-Induced Breakdown (LIB) effects. This spark appears to produce a high thermal gradient and shock wave that is sufficient to create the free radicals needed to start combustion. An investigation determined the feasibility of utilizing these techniques to initiate the combustion process in a fuel combustor, the results of which are published in the master thesis of Ellen R. Mell titled "LASER INDUCED IGNITION OF MONODISPERSE KEROSENE FUEL SPRAYS", available in the Cornell University library, the entire disclosure of which is fully incorporated herein by reference.

As shown in FIG. 6, the fuel residues are optimally absorptive in the ultraviolet spectrum but are substantially less absorptive in the infrared spectrum. Accordingly, the use of infrared radiation to induce the combustion effect produces a significant advantage over ultraviolet radiation because laser energy in the infrared region is substantially unaffected by the fuel residues. In addition to the advantage of not being absorbed by the residue in the combustor, the infrared wavelength does not have to be fine tuned for optimized absorption by the fuel particles. Instead, the infrared energy primarily uses the scattering and focussing effects and not resonant excitation wavelength absorption effects to initiate combustion. As a result, the use of different fuel additives and fuel compositions should not significantly change the capability of the infrared laser energy to ignite the fuel droplets. It is believed that the advantage of minimal wavelength absorption by the residue is a significant advance in laser ignition techniques for combustors, even if in comparison to ultraviolet radiation the energy requirement for ignition with infrared lasers may be an order of magnitude higher.

Having described what I believe to be the operational theory underlying my invention, what follows herein is a detailed description of specific and preferred embodiments for realizing the advantages of my invention.

Figure 1:
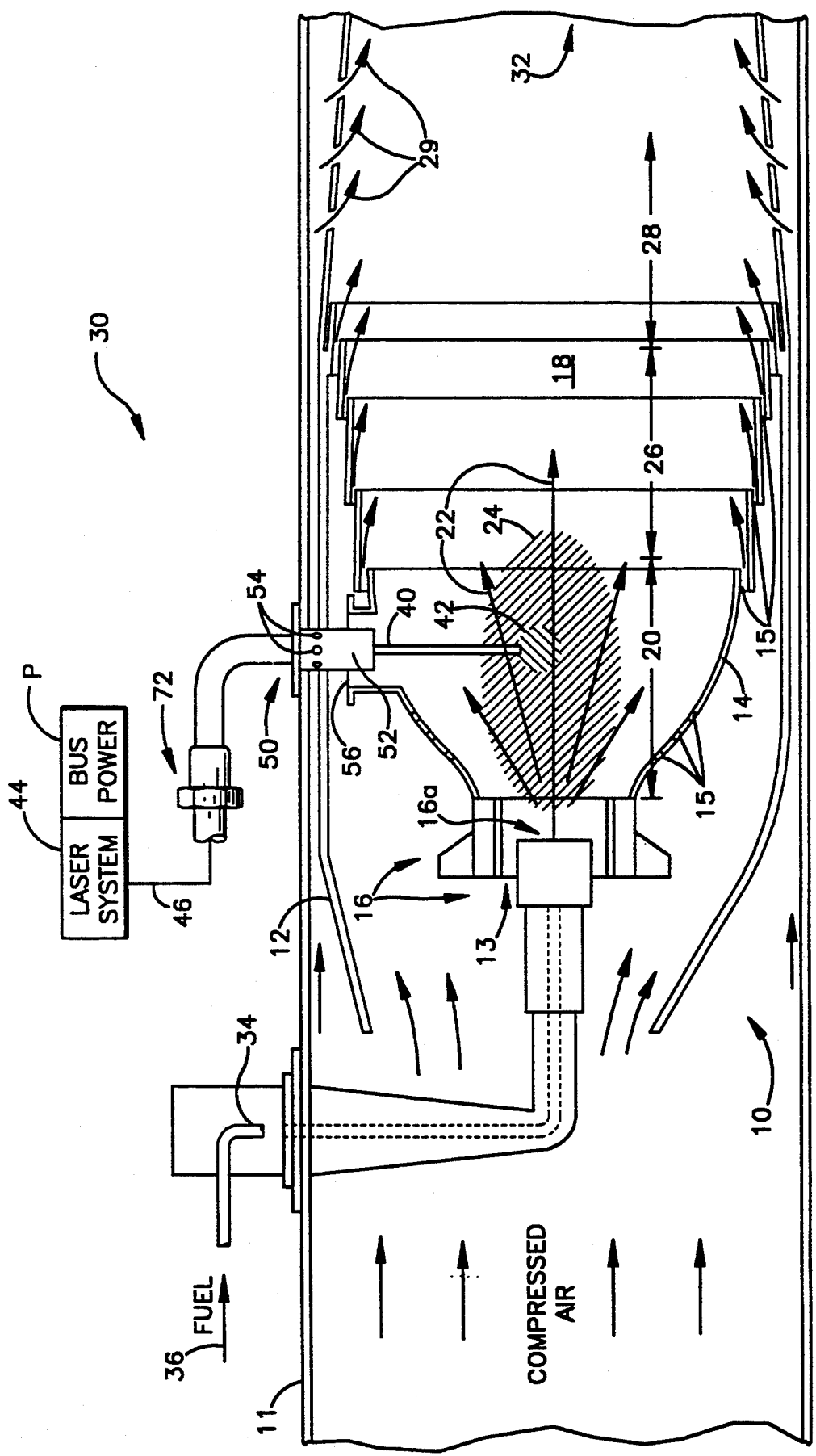
FIG. 1 is a simplified schematic representation of a portion of a combustor, in partial section, illustrating in simplified form an embodiment of the invention therein.

With reference to FIG. 1, a combustor such as may be used in a gas turbine engine is generally designated with the numeral 10. It is important to note that while the invention is described herein with reference to a gas turbine engine, and in particular a can combustor in a gas turbine engine suitable for use on aircraft, such description is merely for convenience and ease of explanation and should not be construed in a limiting sense. The invention is related to the combustion initiation and restart process, rather than being limited to specific engine or combustor designs. By ignition I mean the introduction of external energy into an ignition zone just downstream of a fuel nozzle to cause combustion of a hydrocarbon fuel spray in air, such that the combustion is a self-sustained reaction process between an atomized hydrocarbon fuel spray and air resulting in heat release and gaseous by-products. Those skilled in the art will readily appreciate that the invention can be used with different types of combustors for many types of engines and applications other than in the aerospace and airborne applications, such as, for example, industrial combustion engines. A few gas turbine engine applications of interest are: jet engines including turbojets, turboprops, turbofans, large gas turbine, medium gas turbines, small gas turbines, marine gas turbines, stationary and mobile industrial gas turbines. Combustor systems of interest are: residential and industrial furnace applications, can combustors, can annular combustors, annular combustors and dual annular combustors to name a few. The term "combustor" should be construed in its broadest sense to include any flow through combustion chamber such as identified above, and further including preburners, and so on wherein fuel combustion is initiated. Flow through combustors are generally understood as combustors in which the combustion process is continuous and characterized by an uninterrupted flow through velocity which may accelerate or decelerate due to gaseous expansion or contraction but generally is not interrupted by valves, throttle plates or similar devices (such as are used in pulse jet and ram jet engines.) Flow through combustors are further characterized by relatively high air flow rates through orifices without throttling devices to produce a highly turbulent mixing of combustion air and fuel.

These lists are not intended to be exhaustive, of course, nor are they to limit the scope and application of the invention.

A typical turbine engine combustion chamber includes within a fan casing or air plenum 11 an outer combustor liner 12 that encloses an inner liner 14. For clarity and convenience, only one combustor is shown in FIG. 1. Other combustor designs, of course, could be used and include, for example, annular combustors which would have a plurality of fuel nozzles therein arranged in an annular configuration within the casing 12 (without the can design). The particular type of combustor used will depend on the engine design or combustion application. The invention is suitable for use with many different types of combustors, therefore, the description herein of a can combustor should not be construed in a limiting sense.

The combustor liner 14 is provided with a plurality of carefully designed air vents 15 that permit combustion air to enter the combustor and mix with fuel. Fuel is supplied by one or more fuel nozzle assemblies 16 installed through openings in the inner combustor liner 14. Typically associated with each fuel nozzle assembly 16 are additional air inlets 13 to create a high air flow and turbulence in the proximate area of the nozzle to facilitate air/fuel mixture and uniform combustion. Aerodynamic swirlers have also been incorporated in liner 14 and/or fuel nozzle 16 to further enhance this effect. In the embodiment of FIG. 1, each fuel nozzle assembly 16 may be any conventional nozzle such as a fuel pressure nozzle, air blast nozzle or other type, and is usually specified by the engine manufacturer. The nozzle assembly 16 includes appropriate fittings that couple fuel lines (34) to the nozzle assembly in a known manner. A typical main fuel nozzle design is shown, for example, in U.S. Pat. No. 4,825,628 issued to Beebe. Other nozzle designs are illustrated in "The Jet Engine", published by Rolls-Royce, PLC, Derby, England, the entire disclosure of which is fully incorporated herein by reference, which is but one of many publications that describe nozzle designs. The present invention can be used with many different nozzle designs, however.

The combustor liner 14 defines a combustion chamber 18 that includes three main zones, as is well known to those skilled in the art. The ignition or primary zone 20 is located just forward of the nozzle outlet 16a. This primary zone is a region of high fuel concentration and high air flow, volume and turbulence. Fuel is preferably dispersed into the primary region as represented by the directional arrows 22 so as to provide an optimum area for igniting the fuel, as represented by the shaded region 24. The nozzle 16 preferably provides atomized fuel in the form of a small droplet spray. In accordance with an important aspect of the invention, a laser igniter, generally indicated with the numeral 30, is provided to initiate the main fuel supply ignition process, as will be explained shortly hereinafter.

Just downstream of the primary zone is an intermediate zone 26. In this zone, dilution air (represented by the arrows near the openings and vents 15) is provided to the combustor through the air vents 15. This air is used both to facilitate a homogenous combustion and also to cool the combustor liner 14. After the intermediate zone the combustion by-products pass through a dilution zone 28 where further dilution air 29 is provided to cool the hot gases sufficiently before they pass through the combustor exit 32 to the turbine blades.

Each fuel nozzle 16 receives fuel from a nozzle fuel line 34 connected to a main fuel line 36. The fuel line 34 is coupled to the nozzle 16 by an appropriate fitting (not shown).

Mounted in the combustor 10 is the laser igniter assembly 30 which is used to produce a laser beam 40 that is focused as at 42 preferably within the primary zone so as to ignite the fuel spray 24. The beam focusing is exaggerated in FIG. 1 for clarity and understanding. In the embodiment of FIG. 1, the laser igniter 30 includes a laser source system 44, which may be a conventional laser source powered by the main system power supply P.

The laser igniter assembly 30 uses laser energy produced by the laser energy source 44. The laser source launches collimated laser energy into an optic cable 46. Thus, the laser source 44 can be remotely disposed away from the igniter without significant loss of laser energy. The preferred laser systems of choice are; straight laser diode system or a laser diode pumped crystal/glass rod laser system. In any case the primary laser element preferably will be a laser diode operating in the infrared range such as model no. OPC-AOxx-yyy-CS available from OPTO Power Corporation (where "xx" represents the power in watts, and "yyy" represents the wavelength in nanometers). Of course, any conveniently available laser diode array technology can be utilized at the desired power and wavelength. The straight laser diode system typically consists of a control system, pulse power supply, laser diode array with heat sink, and a lensing system. Simply, this system utilizes the output of a multi laser diode array and a lensing system to produce a collimated laser beam. The control system fires the pulse power supply which energizes the laser diode array resulting in a pulsed laser beam. The control system sets the pulse length, repetition rate and monitors system performance to protect the laser diode array from adverse operating conditions, primarily over temperature conditions. The laser diode pumped crystal/glass rod laser system consists of a control system, pulse power supply, laser diode array, crystal/glass lazing medium (examples are—doped YAG crystal, HO:YLF, and doped phosphate laser glass to name a few) and a lensing system. Simply, the multi laser diode array is pulsed such that photon energy packets are projected into the crystal/glass rod structure. These photon energy packets are timed such that the total stored energy in the crystal/glass rod adds until the rods lasing threshold is reached. At this point the rod lases and emits a laser beam pulse of greater intensity than any of the individual laser diode pulses. The lensing system and control systems operate basically to provide the same functions as in the straight laser diode system. In both instances the laser beam pulses are transmitted to the igniter 30 via the fiber optic cable 46. The laser pulses preferably are approximately 10 nanoseconds to 100 milliseconds in duration, with a wave length of between 800 nanometers and 10,000 nanometers and a peak energy between 0.01 joules and 10 joules, depending on combustor design parameters. The selection of the laser diode determines the wavelength of laser emission.

A preferred embodiment of the laser igniter 30 optics is illustrated in greater detail in FIG. 2. The igniter assembly includes a flange mounted coupler 50 (FIG. 1). The coupler 50 preferably includes a housing extension 52 that extends through the casing 12 into the combustor. The housing extension 52 may be provided with a plurality of air holes 54 for cooling, and may be attached to the combustor liner 14 by any convenient means through an opening 56 (which may conveniently be an existing spark plug opening.) An endplate 53 may be provided with air holes 55 for allowing air from the plenum via holes 54 to pass through to the combustion chamber, as shown in more detail in FIG. 2A.

With specific reference to FIG. 2, the igniter assembly 30 further includes a laser conduit 60 which is attached to the fan casing 11 by means of a flange 62 welded to or integral with the conduit 60. The flange and conduit may be made of high temperature material such as stainless steel. The conduit 60 encloses an optic waveguide or light pipe 64, such as a cladded quartz or sapphire rod. The rod 64 has a first polished end 66 mounted at a threaded end 68 of the conduit 60 using a boss 70 that is welded to the conduit 60. As shown in FIG. 1, the threaded end of the conduit 60 can be conveniently mated to an optical coupler 72 that optically interfaces the optic fiber bundle or cable 46 to the rod end 66. Such a coupler is shown and described in U.S. patent application Ser. No. 844,112 filed on Mar. 2, 1992, now U.S. Pat. No. 5,246,379 commonly owned by the assignee of the present invention, the entire disclosure of which if fully incorporated herein by reference. Typically, the optic fibers in the cable 46 terminate at a ferrule (not shown) and the ends thereof are polished flat. The coupling with the conduit 60 is arranged so that the optic cable 46 does not directly touch the polished rod end 66. This permits a small air gap therebetween that prevents the fibers and rod from becoming scratched. As further illustrated in FIG. 2, when required by engine configuration, the rod 64 can be configured in sections so as to form elbow bends and other non-linear configurations. The rod pieces 64a and 64b, in the example of FIG. 2, are optically aligned and secured together by a metal to glass seal (not shown). However, such sectioning should be kept to a minimum because each such interface carries an optical loss an order of magnitude higher than the transmission loss in the medium.

The output end 74 of the rod 64 is also preferably polished and aligned such that when the igniter 30 is properly mounted on the casing 11, the laser beam 40 will be projected into the primary zone 20. Improved focussing of the beam 40 can be accomplished using a lens/window unit 80 (not shown in FIGS. 1, 2 or 3), which will be described in greater detail hereinafter. The lens focuses the laser beam into the primary zone 20 and can be integrally formed with the window. The window portion helps protect the rod 64 from the heat of the combustion chamber 18. A particular advantage of the laser igniter is that the igniter can be disposed in the cooler air plenum of the engine (outside the fan casing and remote from the primary zone), rather than having to extend into the combustor. This is important because the high heat of the combustion chamber would place a high thermal gradient on the rod that could cause the rod to break. The rod 64 is preferably installed in the conduit 60 cavity with alumina packing 76.

FIG. 3 shows an alternative arrangement for mounting the laser igniter conduit 60 to the fan casing 11. In this embodiment, either the casing 11 or the flange 62 (illustrated in FIG. 3) can include a threaded boss 90 welded to the flange (or fan casing). A threaded nut 92 is attached to the conduit 60 via a sealing ring 94. This arrangement provides for easier and faster assembly of the optical conduit 60 to the casing.

Figure 3A:
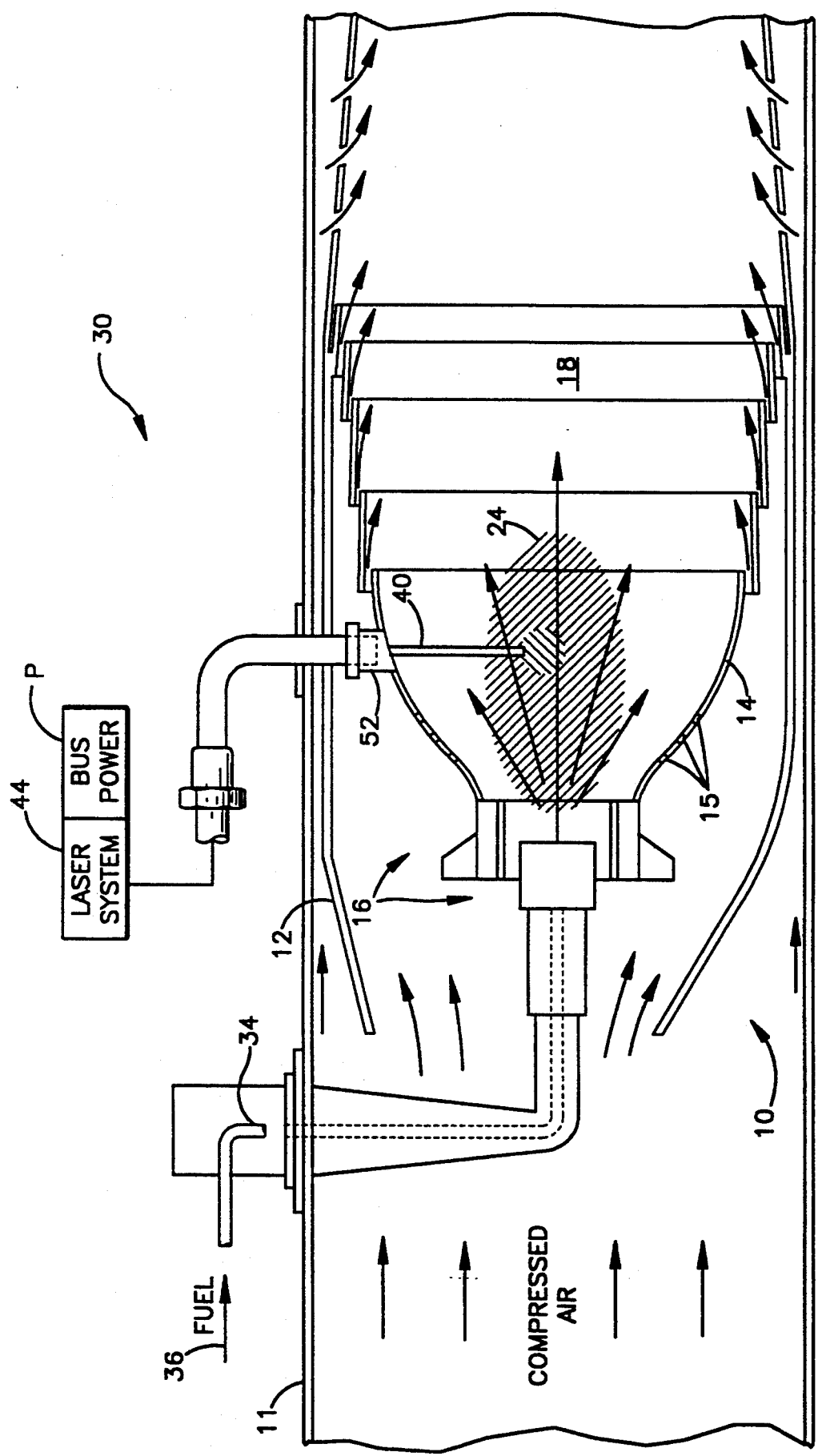
FIG. 3A illustrates another mounting arrangement for an optical igniter according to the invention.

In still another alternative mounting arrangement, FIG. 3A illustrates an arrangement wherein the housing extension 52 is flush mounted with the combustor liner using a boss/nut/seal combination (not shown) similar to the arrangement of FIG. 3. In this arrangement, as well as the arrangement of FIG. 1, the laser energy 40 can be transmitted into the combustion chamber 18 through an existing airhole in the combustor liner 14. This has the added benefit that the inward airflow will help reduce the deposits on the laser igniter window.

The laser igniter 30 can also be installed integrally into the main fuel nozzle 16', and this alternative embodiment is illustrated in FIGS. 4 and 5, wherein like components from FIGS. 1 and 2 are assigned corresponding reference numerals followed by a prime ('). The nozzle 16' includes a preferably centrally disposed optical igniter assembly 30'. Infrared laser energy is optically coupled to the igniter 30' from a laser system 44' via an optic fiber bundle or cable 46'. Fuel can be supplied to the nozzle 16' in a conventional manner through a fuel line 34'.

As illustrated in FIG. 4 the optical igniter 30' produces a light beam 40' that is projected into the primary zone 20' for igniting the atomized fuel spray 24'. It will be noted that in this embodiment the laser energy is preferably projected in a central direction that is generally parallel to the axis of the fuel spray 24' direction but is not limited to a straight line projection. The projection direction and focal point location(s) will be a function of the combustion system requirements. In the earlier described embodiment of FIG. 1, the laser energy was projected in a radial direction into the primary zone 20', generally transverse the direction of the fuel spray 24'.

Preferably, the laser igniter 30' is installed in place of the primary orifice of the nozzle assembly 16'. This results in the laser igniter 30' being centrally disposed in the nozzle assembly 16' so that the laser energy 40' will be projected into the primary zone 20' in the preferred direction. The secondary orifices can be installed in a conventional manner and provide the fuel spray for ignition and combustion. Alternatively, the laser igniter 30' can be installed adjacent the primary orifice and project the laser energy into the primary zone still in generally parallel relation to the direction of the fuel spray.

FIG. 5 shows in greater detail a preferred embodiment of the optical igniter 30'. Many of the components are similar to the optical igniter shown in FIG. 2 with like reference numerals being used followed by a prime ('). Accordingly, the igniter 30' includes a stainless steel conduit or case 60' that encloses an optic fiber bundle or cable 100. In the embodiment of FIGS. 4 and 5, an optic fiber cable is preferred over a quartz or sapphire rod (as in the embodiment of FIGS. 1 and 2) because of the closer proximity of the igniter 30' to the combustion chamber heat. The combustion heat could produce a high thermal gradient on a rod that could result in failure. However, a rod could be used in those situations where the combustor operates at a temperature that a rod could withstand. In yet another alternative, a line of sight arrangement can be used in which a simple light conduit (preferably sealed) in the form of an open passageway through the case 60' (for example, the passageway 101 provided for the fiber bundle 100) could be used, with appropriate lenses and or mirrors used to control propagation of the laser energy.

The optic cable is preferably installed in the conduit 60' surrounded by a high temperature material such as alumina packing material 76'.

As shown in FIG. 4, the optic fiber cable 46' from the laser source 44' can be routed to the igniter 30' via the fuel line conduit C. The optical fiber bundle 46' is installed in the igniter 30' by any convenient means such as a ferrule (not shown) and in optical alignment with the igniter cable 100. The cable 46' preferably does not touch the cable 100, but rather an air gap 106 is provided therebetween. The igniter cable 100 is also held within the igniter 30' at the input end by a ferrule 104a or other convenient means. The cable 100 output end 102 is disposed adjacent but preferably not in contact with an optic lens 82 (made of a suitable material such as quartz or sapphire) in the lens/window unit 80 for collimating and focussing the light beam 40' to the correct position in the primary zone 20'. A ferrule 104b can be used to secure the output end of the cable 100. The lens/window unit 80 may be similarly used for the optical igniter shown in FIGS. 1 and 2 as mentioned earlier herein and is transmissive to infrared radiation. The lens and window can, of course, be realized in an integral piece wherein a window also functions to focus the transmitted light. The unit 80 preferably includes a sapphire window 84 which is sealingly held in the conduit 60' using a ceramic seal 86. The sapphire window protects the optical components from heat and other environmental effects from the close proximity of the igniter to the combustor 10' and nozzle 16'. The ferrules 104a and 104b for the cable 100 can be threadably engaged with the conduit 60', held by a glass seal or can be secured therein with set screws, to name just three examples. The cable 46' can also be connected to the igniter 30' using a threaded ferrule or other convenient means.

A particular advantage of the invention is that the laser igniter can be used as a direct replacement for a conventional plasma spark igniter. In such a situation as FIG. 1, for example, the laser igniter can be installed in the same location as the plasma igniter, thus not changing the combustor design or configuration. In this embodiment, the optic cable 46 would directly replace the high tension lead used to connect the exciter circuit to the plasma igniter. The laser source 44, of course, would directly replace the exciter circuit. The laser igniter can also be used in combination with an electrostatic atomizing fuel nozzle for improved ignition as described in my copending U.S. patent application Ser. No. 08/067,652 for "Ignition Methods and Apparatus for Combustors" filed on May 26, 1993 and commonly owned by the assignee of the present invention, the entire disclosure of which is fully incorporated herein by reference. The laser igniter also can be remotely disposed relative to the hot combustion chamber, while still providing the principal ignition energy into the primary zone of the combustor. Still a further advantage of the invention is that the laser igniter can be installed as a separate unit and connected to the laser source by optic cables. This arrangement permits easy access and replacement of the various laser ignition system elements.

Furthermore, the laser igniter also allows an engine designer to optimize the combustor design without constraints being imposed by the ignition system requirements. In other words, with conventional ignition systems, the combustor design is compromised to guarantee reliable ignition because the igniter is located at the combustor periphery where air/fuel ratios are not optimal. Because the present invention provides an improved combustion ignition technique, the position of the igniter is no longer a limitation on the combustor design.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. A method of igniting fuel in a flow through combustor comprising the steps of:
   a. producing an atomized fuel spray in an ignition zone of the combustor;
   b. directing infrared laser energy into the ignition zone at a wavelength substantially unabsorbed by the fuel spray; and
   c. focussing the laser energy to initiate combustion of the fuel spray and an unthrottled air flow.

2. The method of claim 1 wherein the step of transmitting laser energy into the ignition zone includes the step of optically coupling laser energy from a laser energy source through an infrared transparent window in the combustor liner in a direction that is generally transverse the direction of the fuel spray.

3. The method of claim 1 wherein the step of transmitting laser energy into the ignition zone includes the step of optically coupling laser energy from a laser energy source to a laser igniter in a primary fuel nozzle in a direction generally parallel to the direction of the fuel spray.

4. The method of claim 2 wherein the combustor operating cycle produces fuel residue that absorbs ultraviolet energy and substantially less absorbs infrared energy.

5. The method of claim 4 wherein the step of using the laser energy to initiate combustion includes the step of non-absorptively focussing the laser energy using the atomized fuel droplets to initiate combustion of the fuel.

6. Apparatus for igniting fuel in a flow through combustor having at least one fuel nozzle that emits an atomized fuel spray into an ignition zone of the combustion chamber comprising:
   source means for producing infrared laser energy at a wavelength substantially unabsorbed by the fuel spray;
   means for providing an unthrottled air supply through the combustor; and
   optic means for directing said laser energy from said source means into the fuel spray in the ignition zone of the combustor, the laser energy being focused to ignite the fuel spray.

7. The apparatus of claim 6 wherein said optic means comprises an infrared transparent window for said laser energy to pass into the primary ignition zone.

8. The apparatus of claim 7 wherein combustion of the fuel produces fuel residue that absorbs ultraviolet energy and substantially less absorbs infrared laser energy.

9. The apparatus of claim 8 wherein said window is disposed at or near the combustor liner so that said laser energy is transmitted into the primary zone generally transverse the direction of fuel spray.

10. The apparatus of claim 8 wherein said window is disposed in the fuel nozzle so that said laser energy is transmitted into the primary zone generally parallel the direction of fuel spray.

11. The apparatus of claim 8 wherein said window is disposed in a laser igniter means for transmitting said laser energy through the combustor liner, said igniter means being mounted on a support casing.

12. The apparatus of claim 11 wherein said laser igniter means further comprises a light conduit in a hermetic housing, said conduit being separated from the combustion chamber by said window.

13. The apparatus of claim 12 wherein said light conduit includes a light rod made of high temperature infrared transparent medium.

14. The apparatus of claim 13 wherein said window also serves as a lens to focus said laser energy in the primary zone.

15. The apparatus of claim 13 wherein said laser igniter means further comprises a quartz lens disposed between an output end of said rod and said window.

16. The apparatus of claim 15 wherein said optic means further comprises optic fiber means for transmitting laser energy from said source means to an input end of said light rod.

17. The apparatus of claim 16 wherein said rod comprises two pieces of sapphire rod which approximately form a ninety degree bend.

18. The apparatus of claim 6 wherein said optic means comprises a laser igniter means disposed in the fuel nozzle for transmitting laser energy through the nozzle into the primary ignition zone.

19. The apparatus of claim 18 wherein said igniter includes a housing, optic fiber means in said housing for transmitting laser energy through said housing, and infrared transparent window means for sealing said igniter means from the combustion chamber; said optic fiber means being optically connectable to a second optic fiber means for transmitting laser energy from said source means to said igniter means.

20. The apparatus of claim 19 wherein said window means also functions as a lens to focus laser energy in the primary zone with at least one focal point.

21. The apparatus of claim 20 wherein said window means comprises a high temperature infrared transparent material.

22. The apparatus according to claim 18 wherein said laser igniter means is disposed in the fuel nozzle in place of a primary orifice.

23. The apparatus according to claim 6 in combination with an aircraft gas turbine engine.

24. The method of claim 1 wherein the step of focussing the laser energy to initiate combustion of the fuel spray includes focussing the laser energy so as to produce a plasma discharge that ignites the fuel.

25. The method of claim 24 wherein said step of focussing the laser energy includes using the atomized fuel droplets for focussing and concentrating the laser energy to produce a plasma discharge.

26. The method of claim 1 including igniting aircraft fuel in a turbine engine.

27. The apparatus of claim 6 wherein said optic means and fuel spray droplets focus said laser energy to produce a plasma discharge that ignites the fuel.

28. The apparatus of claim 27 wherein the plasma discharge is a laser induced spark in the air/fuel mixture to initiate combustion.

* * * * *